US005348612A

United States Patent [19]

Buetikofer et al.

[11] Patent Number: 5,348,612

[45] Date of Patent: Sep. 20, 1994

[54] DEVICE FOR ADJUSTING THE DISTANCE BETWEEN A GLUE APPLYING ROLL AND A WEB LEADING ROLL

[75] Inventors: Peter Buetikofer, Horst-Hostein; Martin Hoffmann, Tangstedt; Jens Schulz, Hamburg, all of Fed. Rep. of Germany

[73] Assignee: Peters Maschinenfabrik, Hamburg, Fed. Rep. of Germany

[21] Appl. No.: 78,043

[22] Filed: Jun. 18, 1993

[30] Foreign Application Priority Data

Jun. 19, 1992 [CH] Switzerland ....................... 01935/92

[51] Int. Cl.[5] .......................... B32B 31/04; B31F 1/28

[52] U.S. Cl. .................................... 156/578; 118/249; 118/262; 156/471; 156/472

[58] Field of Search ............... 156/470, 471, 472, 473, 156/578, 205, 210; 118/248, 249, 262, 258

[56] References Cited

U.S. PATENT DOCUMENTS

| | | | |
|---|---|---|---|
| 2,589,966 | 3/1952 | Rullo | 156/472 X |
| 3,931,791 | 1/1976 | Preuss et al. | 118/249 X |
| 4,059,474 | 11/1977 | Coburn | 156/578 X |
| 4,267,008 | 5/1981 | Owens . | |
| 4,569,714 | 2/1986 | Tokuno . | |
| 4,631,109 | 12/1986 | Hirakawa et al. | 156/472 |
| 4,738,744 | 4/1988 | Saller | 156/472 |
| 5,122,220 | 6/1992 | Seki | 156/470 |

FOREIGN PATENT DOCUMENTS

| | | |
|---|---|---|
| 0024029 | 2/1981 | European Pat. Off. . |
| 0092079 | 10/1983 | European Pat. Off. . |
| 0380083 | 8/1990 | European Pat. Off. . |
| 3439227 | 4/1986 | Fed. Rep. of Germany . |
| 2487733 | 2/1982 | France . |

*Primary Examiner*—Michael W. Ball
*Assistant Examiner*—Michele K. Yoder
*Attorney, Agent, or Firm*—Hill, Steadman & Simpson

[57] ABSTRACT

A device for adjusting the distance between a web leading roll, such as a corrugating roll, and a glue applying roll in a glue unit comprises a shaft arranged to extend across the frame of the machine parallel to the glue applying roll with the gluing unit for the glue applying roll engaging the shaft, an arrangement for lifting the gluing unit to rotate around the shaft so that the glue applying roll will be positioned closer to the web leading roll and the device includes at least one cam mounted in the frame to engage a stop on the subframe of the glue unit to limit the amount of movement in elevation of the gluing unit.

8 Claims, 2 Drawing Sheets

DEVICE FOR ADJUSTING THE DISTANCE BETWEEN A GLUE APPLYING ROLL AND A WEB LEADING ROLL

BACKGROUND OF THE INVENTION

The present invention is directed to a device for the adjustment of the distance between a glue application roll and a web leading roll for webs of paper or of a "single-face" corrugated board located in a corrugating machine.

In the so-called "single-face" station located upstream of a corrugating machine, a first web of paper is corrugated when it is passed between two corrugating rolls, which include an upper and a lower roll. A glue applying or application roll located almost on the level of the lower corrugating roll applies glue on the crest of the corrugated paper prior to the application of a second, covering web by means of a pressure roll arranged under the lower corrugating roll.

The quality of the single-face corrugated cardboard depends very much on the quality of the glue applying operation during which a precise quantity of glue is to be applied along every paper crest. This precision regarding the quantity of glue depends on the regular and accurate thickness of the glue present on the periphery of the glue applying roll, which is part of the gluing unit. Hence, in the course of its rotation, a surface of the glue applying roll of the gluing unit will pass, first, into a glue container and then in front of a dosing roll, whole position is such that it rejects the excess or surplus glue so as to let only the required amount pass between the two rolls.

This precision regarding the quantity of glue applied depends, of course, on the accurate adjustment of the distance between the glue applying roll and the lower corrugating roll, which requires a rigorous setting of the position of the gluing unit with regard to the frame of the "single-face" station, which supports the corrugating rolls.

For the regular cleaning of the gluing unit and of the corrugating rolls, it is common to use a gluing unit which is provided with rollers to ride along rails in order to make it easy to take the gluing unit out of the device from the back of the station.

A known device for the adjustment of the distance between the glue applying roll and the lower corrugating roll comprises two conical stops which protrude at right angles from the inner surfaces of the two lateral walls of the frame of the single-face station. Each of these conical stops can be advanced into or retracted from the wall and, hence, when the gluing unit is pushed into the station until it rests on the two stops, its final position will depend on the preset advance position of each of these stops. Thus, a complete retraction of the stops provides the maximum advanced position for the unit and, hence, a minimum distance possible between the glue applying roll and the corrugating roll. However, in practice, this device has proven to be unsatisfactory because of offals or other impurities falling on the rails, which deposits involuntarily raise the unit and set the glue applying roll too close to the lower corrugating roll. Also, because of wear marks on the rails, it sometimes will provide an uncontrolled lowering of the glue applying unit, which will set the glue applying roll too far from the corrugating roll. In the first case, the crests of the corrugating paper are slightly compressed and the glue will then overflow onto either side of the crests. In the second case, the glue application is insufficient, if it even occurs.

SUMMARY OF THE INVENTION

An object of the present invention is to provide a device for a fine adjustment of the distance between the glue applying roll and the web leading roll, i.e., a device that is almost insensitive to deposits or dust but still allows different fine adjustments between the right-hand side and left-hand side of the roll and also facilitates the adjustment in the course of operation. Moreover, this device is to be of a simple structure, especially by way of its conception and arrangement of its main parts or elements.

To accomplish these goals, the present invention is directed to an improvement in a device for the adjustment of the distance between a glue-applying roll of a gluing unit which is provided in a frame of a machine having a web leading roll, such as a corrugating roll for forming single-face corrugating board, the glue applying roll being positioned adjacent the corrugating roll to apply a uniform layer of glue onto the web passing therebetween. The improvement comprises the frame of the machine having a shaft extending transverse therethrough and parallel to the web leading roll, said gluing unit having a subframe with a portion engaging the shaft to allow the subframe to rotate on the shaft between a first position with the glue applying roll being spaced from the web leading roll and a second position with the glue applying roll being closer to the web leading roll, means for lifting the gluing unit to rotate on said shaft between said first and second positions, and at least one cam being fitted on one of the main frame and subframe to coact with a stop provided on the other of the main frame and subframe, means for adjusting the orientation of said cam so that engagement of the cam with the stop will limit the amount of elevation of the gluing unit in said main frame.

The gluing unit is entirely taken in charge between the shaft and the lifting means and becomes totally independent from the initial condition of support on the stand of the main frame. Moreover, the final position of the unit is interlocked horizontally by means of the shaft, as well as vertically by the cam position. It is still possible to simply modify in the course of the operation the orientation of the cam and the action of the lifting means in order to readjust the position of the gluing unit and, hence, the final position of the glue application roll.

Advantageously, the structure of the glue unit comprises a subframe of two lateral rigid plates held vertically and parallel by means of crossbars that allow a certain torsional movement of the gluing unit along a theoretical axis extending parallel to the glue applying roll. Two distinct adjustment devices, for example a right-hand one and a lefthand one, are then foreseen and these are arranged to allow an imposition of a misposition on the glue applying roll in order to compensate for a slight initial mispositioning of the corrugating roll.

The shaft consists preferably of two pivots fitted opposite one another in the lower part of the lateral plates of the machine frame. Every lateral plate of the subframe of the glue unit has, at its lower front end, a hook oriented to face toward the bottom of the glue unit and for engaging on the corresponding pivot. Preferably, the downwardly oriented part of the hook has a V-shape.

The lifting means of the subframe for the glue unit preferably comprises a pair of actuators arranged in the main frame of the machine on a spot of a lifting point situated almost at the lower rear end of each of the lateral plates forming the subframe for the gluing unit. Owing to this arrangement, these lifting means support at least half the weight of the unit, a fact which allows a better control of their incidence onto the final position.

Advantageously, the gluing unit comprises a pair of outer stops situated in the lower medium part of every lateral plate forming the subframe and the main frame is provided with a corresponding cam comprising a cylinder mounted eccentrically on an axle which extends across the main frame, and this axle is then rotated from the outside of the frame. The axle of the cam is connected outside the frame to the first end of a lever arm, whose other arm is activated by an actuator. This cam conception using a cylinder eccentrically mounted on the axle allows a very fine adjustment, especially if the axle can be rotated very slightly owing to the amplification of the lever.

When this device is applied to a gluing unit having rollers on the subframe to ride on rails of the main frame, it is a benefit to have the pivots have a cross section in the shape of circular segments with a plane portion. Each pivot is rotatable by means of an actuator in order to orientate a plane portion toward the top of the gluing unit in order to disengage the hooks by means of translation of the unit along the rails outside of the station.

Other advantages and features of the invention will be readily apparent from the following description of the preferred embodiments, the drawings and claims.

DESCRIPTION OF THE PREFERRED EMBODIMENTS

Figure 1:
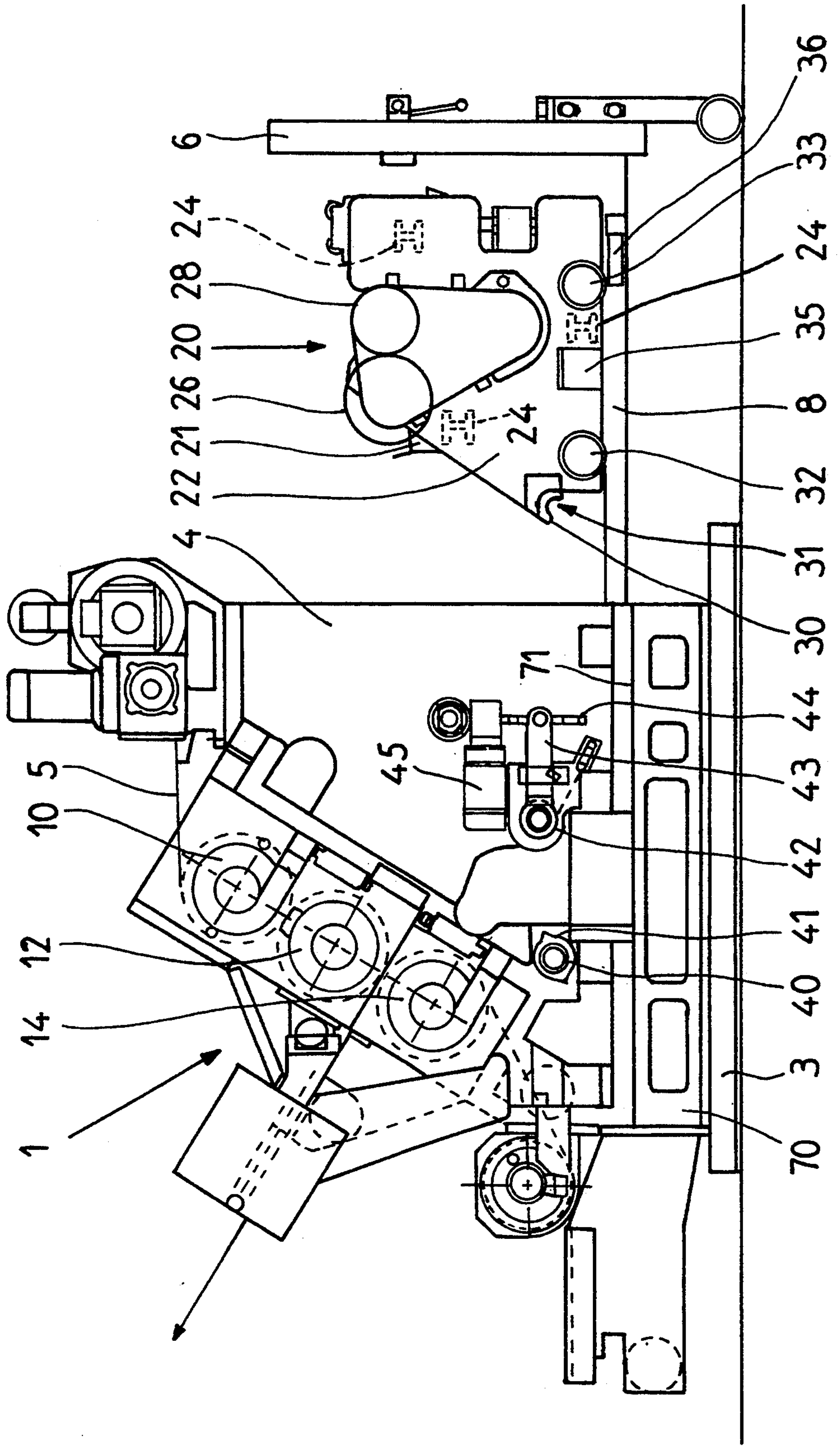
FIG. 1 is a schematic side view of a single-face station with a gluing unit which is in a disengaged or removed position.
Figure 2:
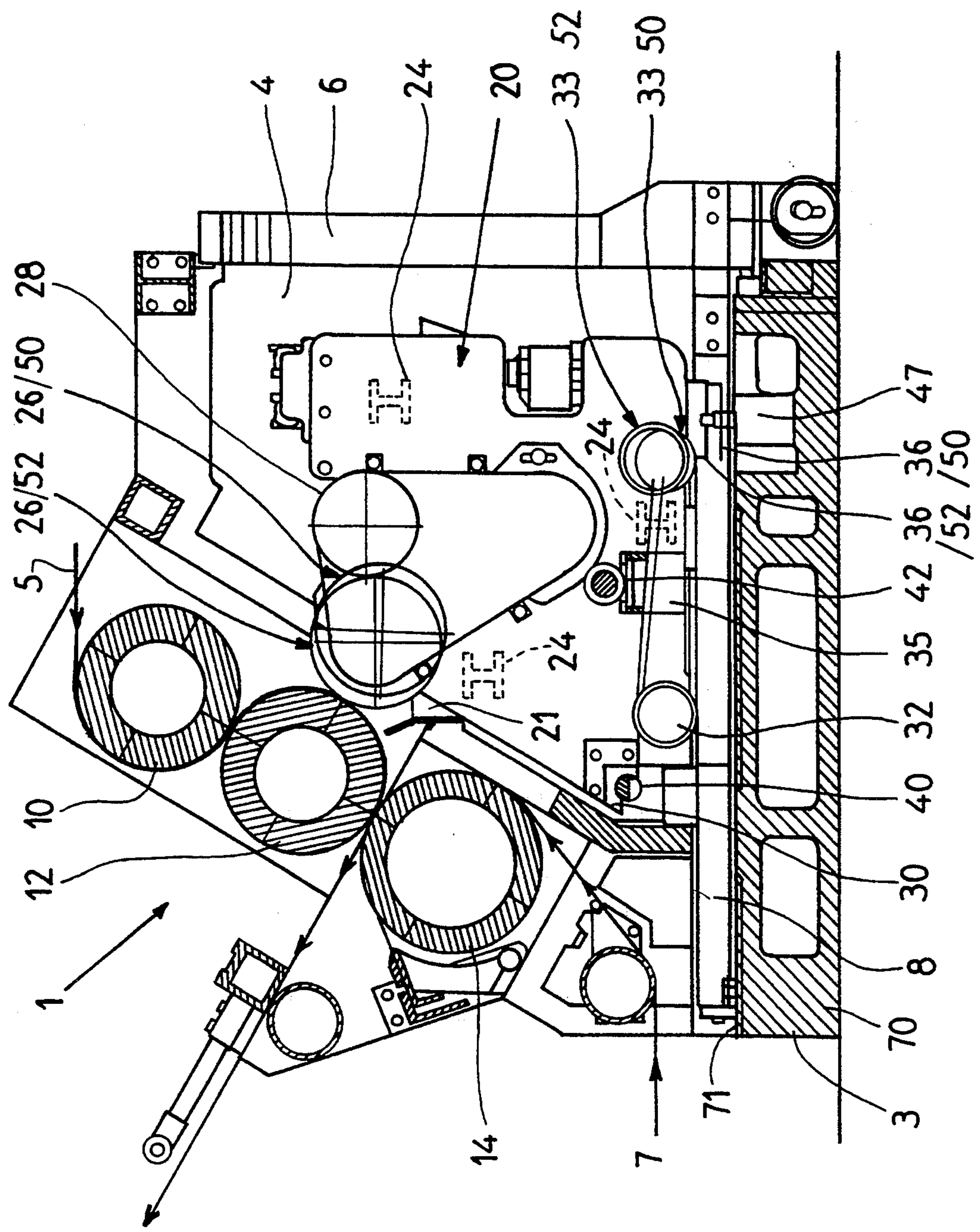
FIG. 2 is a schematic enlarged cross sectional view with portions showing the two possible positions in the operable position for the glue application roll.

The principles of the present invention are particularly useful when incorporated in a single-face station, generally indicated at 1 in FIGS. 1 and 2. In a single-face station 1, a first paper web 5 coming from above is corrugated when it passes between an upper corrugating roll 10 and a lower corrugating roll 12. While engaged on the lower corrugating roll 12, the web receives a layer of glue on the crest of the corrugations from a glue applying roll 26 prior to the application of a covering paper 7 by means of a lower pressure roll 14. The corrugating rolls 10, 12 and 14 are mounted in a main frame 3, which includes a pair of lateral walls 4.

A gluing unit 20 includes a glue container 21 in which the glue application roll 26 dips. A dosing roll 28 is positioned close to the glue application roll 26 at a predetermined distance adjusted at any time. Therefore, when the glue application roll rotates counter-clockwise, as illustrated in the Figures, it picks up glue from the container 21 and the surplus glue is rejected or removed by the dosing roll 28 so that only a homogeneous, regularly-thick layer of glue will remain on the upper periphery of the application roll 26.

In this mode of realization, the structure of the gluing unit 20 has a subframe formed by two lateral rigid plates 22 held vertical and parallel to each other by means of three horizontal crossbars 24. The lateral plates 22 are both fitted on the front rollers or wheels 32 and on rear rollers or wheels 33 in order to slide on rails 8, whose rear ends are carried by a mobile door 6, and the front ends are supported for sliding on a surface 71 of the stand or base 70 of the main frame 3. As illustrated in FIG. 1, it is possible to take the mobile door 6 out of the frame 3 at any time and to then roll this gluing unit 20 backward for repair, cleaning or maintenance, as well as to provide access to the rolls 10, 12 and 14 from the back for similar operations.

According to the invention, two pivots 40 are fitted opposite one another in the lower front part of the inside surfaces of the lateral walls 4 and are almost vertically underneath the lower corrugating roll 12. As may be gathered from FIG. 2, every pivot 40 shown in cross section has the shape of a circular segment or, in other words, a circular section in which a plane portion has been machined from the cylinder. The height of this circular segment is contained between $\frac{1}{2}$ and $\frac{3}{4}$ of the initial diameter. Each pivot 40 is connected on its extension to a rotary actuator 41, which allows, if necessary, the orientation of the plane portion or cutout portion downward or upward. In a corresponding manner, the front end of each of the lateral plates 22 has a reinforced hook 30 which opens downward. A lower side 31 of these hooks 30 (FIG. 1) will engage on the pivot 40 and preferably has a downward-orientated V-shape so as to minimize the wear effects.

The adjusting device according to the present invention comprises, moreover, two cams 42 which are also arranged in the lower, but almost middle part, of the inner surfaces of the lateral walls 4 of the main frame 3. As may be gathered from FIG. 2, the cams 42 have the form of a cylinder protruding perpendicular from the lateral wall 4 and are mounted eccentrically on an axle which extends between the two walls 4. As illustrated in FIG. 1, the outer end of this cylinder is connected to one of the ends of a lever arm 43, whose other end is connected by a reversing rod 44 to an actuator 45. As illustrated, the actuator 45 is a motor with a gear box that drives the threaded rod 44, which is threaded into a nut on the end of the lever 43. Furthermore, every lateral rigid plate 22 of the subframe of the gluing unit 20 has its lower medium part provided with a stop 35.

The adjusting device according to the present invention includes a pair of vertically-acting hydraulic jacks 47 provided in the base 70 of the main frame 3 (see FIG. 2), which are close to the lateral side walls 4 of the main frame and to the mobile door 6 adjacent the back. In fact, the position of one of the pairs of lifting points 36 engaged by the actuator 47 belongs to the lower rear part of the lateral plates 22 forming the subframe of the gluing unit 20 when the gluing unit is in the operable position, as illustrated in FIG. 2.

The above-described adjusting device functions as follows. The plane portion of the pivot 40 is initially orientated upward in order to allow the insertion of the gluing unit 20 into this frame 3 until the hooks 30 pass above each of the pivots 40. Then, the rotary actuator 41 is activated in order to rotate the plane portion of each of the pivots 40 downward, which action causes engagement of the circular part on the hook 30 and stops therewith all lateral and interior translational movement of the gluing unit 20 along the rails 8. The cams 42 have been set in a proper position in the prior phase, and the pair of jacks 47 are actuated with each jack raising the corresponding lateral plate 22 until the stop 35 will rest on the cam 42. Thus, with actuation of the jacks 47, the frame is shifted from a first position 50, in which the rear rollers 33 rest on the rails 8 and wherein the glue applying roll 26 is disengaged, to a second operable position 52, in which the rollers 32 and 33 are lifted off of the rails 8 and in which the glue applying roll 26 is now close to the lower corrugating roll 12 at a very precise distance.

As may be gathered, the gluing unit 20 is not able to move either backward, due to it being hooked on the pivots 40, or vertically, due to the action of the jacks 47 and the coaction of the stops 35 on the cams 42. In other words, the rigidity of the lateral plates 22 of the subframe in the vertical plane are used to pass on the fine adjustments done at the bottom of the unit onto the glue applying roll 26. Moreover, in this mode of realization, the doubling of the elements at the level of every lateral plate 22 will permit, in a certain way, a separate adjustment which is necessary to allow one side to be set slightly higher than the other in order to compensate for mispositioning of the lower corrugating roll 12 owing to a slight torsional flexibility of the crossbars 24. It is also to be mentioned that the actuators 41 and 45 may be arranged on the outer side of the lateral walls 4 of the main frame 3 so that they will not be submitted to the temperature strains that exist in the station during its operation and so that they will allow an easy access, especially if one of the adjustments is to be modified.

Although it has been illustrated as used in a single-face station, this device for the adjustment of the distance between a glue application roll and a web leading roll, which operation is achieved by raising the gluing unit assembly, can also be used with some modifications in the gluing station arranged upstream of the so-called double-face station in which several corrugating webs are assembled with a covering paper in order to make up a double-face or a treble-face corrugated cardboard. Numerous improvements can also be added to this device within the limits of this invention.

Although various minor modifications may be suggested by those versed in the art, it should be understood that we wish to embody within the scope of the patent granted hereon all such modifications as reasonably and properly come within the scope of our contribution to the art.

We claim:

1. In a device for adjusting the distance between a glue application roll provided in a subframe of a gluing unit and a web leading roll mounted in a main frame of a machine, the improvements comprising a shaft extending transverse across the main frame and parallel to the axis of the web leading roll, a subframe of the gluing unit engaging said shaft and enabling rotation thereon, means for lifting the subframe of the gluing unit to rotate around said shaft to move a glue application roll between a position spaced from the web leading roll to a position closely adjacent the web leading roll, at least one cam, means for mounting the cam on one of the main frame and subframe, a stop being mounted on the other of said subframe and main frame, said means for mounting the cam enabling adjustments in the orientation of the cam, said cam coacting with the stop to limit the amount of elevation of the gluing unit to determine the second position with the glue application roll close to the web leading roll.

2. In a device according to claim 1, wherein the subframe of the gluing unit includes two lateral rigid plates held vertically and parallel by means of crossbars which allow a certain torsional movement of the glue unit along a theoretical axis extending parallel to the glue application roll.

3. In a device according to claim 1, wherein the shaft consists of two pivots mounted opposite one another on a lower part of the lateral side walls of the main machine frame, said subframe having two lateral plates, each plate having a hook adjacent the bottom of the gluing unit and orientated for engaging on the corresponding pivot.

4. In a device according to claim 3, wherein the hooks have a downward orientated part having a V-shape.

5. In a device according to claim 3, wherein each of the pivots has a cross section in the shape of a circular segment with a plane portion, each pivot being rotated by means of an actuator in order to orientate the plane portion to a position facing toward the glue unit in order to free the hook to allow removal of the glue unit along rails of said machine.

6. In a device according to claim 1, wherein the means for lifting of the glue unit comprises a pair of actuators arranged in the main frame of the machine adjacent a spot of a lifting point in order to act on a lower rear end of the lateral plates of the subframe of the glue unit.

7. In a device according to claim 1, wherein the gluing unit comprises a pair of stops situated in the lower middle part of lateral plates forming the subframe, the cams being formed by cylinders which are eccentrically mounted on an axle of the means for mounting the cams, said axle interconnects side walls of the main frame and being rotatable from the outside of the frame.

8. In a device according to claim 7, wherein the axle of the cams is connected outside the frame to a first end of an arm, the other end of said arm being connected to an actuator means for pivoting the arm, to rotate said axles and cams.

* * * * *